United States Patent Office 2,844,724
Patented July 22, 1958

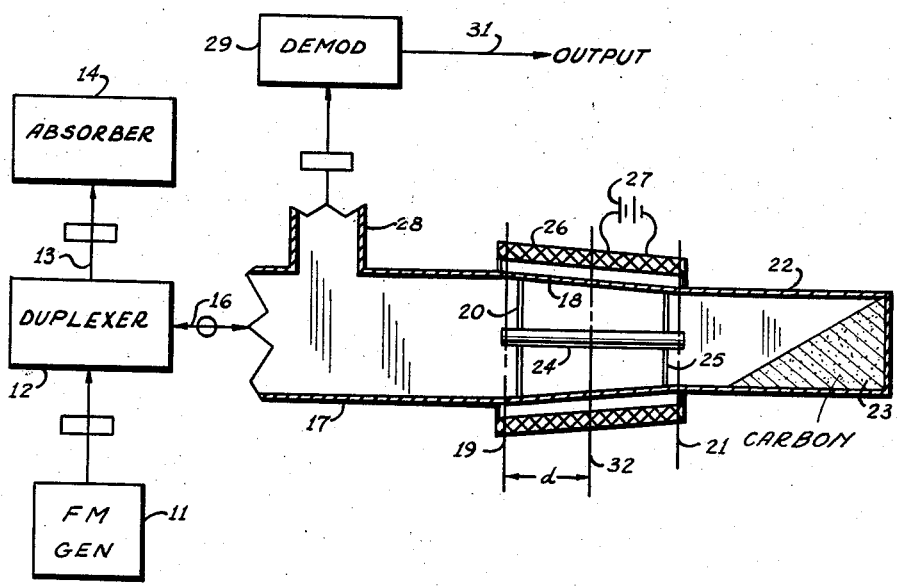

2,844,724

MICROWAVE FREQUENCY MODULATION TRANSDUCER

Julius T. Fraser, Pleasantville, N. Y., assignor to General Precision Laboratory Incorporated, a corporation of New York Application May 22, 1957, Serial No. 660,906

5 Claims. (Cl. 250—27)

This invention relates to an apparatus designed to convert frequency-modulated microwave signals to amplitude-modulated microwave signals. More particularly, the invention provides an arrangement which does not utilize resonant circuits in the usual sense and hence is wideband compared to prior devices of this nature.

The invention depends primarily upon the principle that a microwave waveguide acts as a high-pass filter and has a cutoff at the low end of the transmitted frequency band explicity dependent upon one dimension of the waveguide cross section. In order to employ this frequency-sensitive behavior of waveguides use is made of a tapered waveguide combined with a ferritic rotator and an output branch so placed as to be sensitive to the orientation of the microwave field applied to it.

In one form of this invention a tapered round hollow waveguide is provided with a central magnetized ferrite rod. This tapered section is so dimensioned that the cutoff frequency at a median point in the length of the section is equal to the carrier frequency which is to be employed. Consequently, when microwave energy is applied to the larger end of the tapered section all cross sections thereof having radii progressively larger than the median radius will have a cutoff at frequencies progressively lower than the carrier frequency, and all cross sections having radii progressively smaller than the median radius will have a cutoff at frequencies progressively higher than the carrier frequency. This relation of cutoff wavelength to radius is simply:

$$\lambda_c = 3.41 r \quad (1)$$

in which $\lambda_c$ is the cutoff wavelength of the round waveguide for the transverse $TE_{11}$ mode and $r$ is the radius of the waveguide. At cutoff the wavelength in free space, $\lambda$, equals $\lambda_c$, and the microwave cutoff frequency $f_c$ is $$f_c = \frac{0.879 \cdot 10^{10}}{r} \quad (2)$$

The range of cutoff frequencies $f_c$ throughout the tapered section is made to be somewhat larger than the bandwidth of the frequency-modulated signal which is to be demodulated.

When such a frequency-modulated signal is applied to the tapered waveguide, at any selected instant the input signal at its then frequency arrives at the point along the tapered section where the signal frequency and cutoff frequency are equal, and the signal is reflected toward the source. However, the signal in travelling to and from the cutoff reflection point twice traverses a length of the ferrite rod and twice undergoes field rotation, both times in the same direction, so that the reflected signal is oriented differently from the incident signal by an amount depending on the length of ferrite rod traversed which in turn is dependent on the cutoff frequency. A rectangular guide side arm is positioned between the source and the tapered section in such angular position around the round waveguide as to be unaffected by energy from the source but to be affected by and transmit reflected rotated energy to a degree depending on the amount of rotation. The strength of the emitted signal thus depends on the degree of rotation and is a measure of the amplitude of the original modulation signal.

To recapitulate, the original modulation signal amplitude produces a frequency-modulated signal having an excursion proportional to modulation amplitude. The tapered waveguide cutoff distance along its axis is proportional to the signal frequency excursion. The angular rotation experienced by the reflected signal is proportional to the cutoff distance and the output arm emitted signal amplitude is proportional to the angular rotation.

The signal emitted by the waveguide sidearm is thus amplitude modulated while retaining its frequency modulation. It may now be demodulated by any suitable means, which in the current art generally includes a crystal demodulator, and the original modulating signal envelope is thus recovered.

The principal purpose of this invention is to provide a device for generating an amplitude-modulated microwave signal from a frequency-modulated microwave signal.

Another purpose of this invention is to provide a microwave discriminator deriving from a frequency-modulated microwave signal an amplitude-modulated signal representing the original modulation signal.

A further understanding of this invention will be secured from the detailed description and single drawing depicting a cross section of a tapered waveguide and a schematic circuit for carrying out the purposes of this invention.

Referring now to the drawing, a generator 11 generates frequency-modulated microwave energy, this energy being modulated at a frequency and with an amplitude which may vary in any desired manner. The microwave energy is applied to a microwave duplexer 12 which may have any form, one convenient form being that described in Patent No. 2,644,930. The duplexer output arm for reflected energy 13 is connected to a device 14 for absorbing reflected energy. The energy from generator 11, after passing through duplexer 12, is transmitted through a round microwave waveguide 16 to a round hollow microwave waveguide 17 which is provided with a round tapered section 18. This tapered section 18 has a radius which is progressively reduced from a value at the input cross section 19 equalling the radius of the round guide 17 to a smaller value at the other end having a cross section 21. At the cross section 21 the tapered section is connected to a round waveguide 22 of the same radius and provided with a microwave absorbing element consisting of a graphite wedge 23. The tapered section 18 is provided with an axially-positioned thin ferrite rod 24, which is supported by two thin dielectric discs 20 and 25. The diameter of this rod is on the order of one tenth of the larger diameter of the tapered microwave section. The rod 24 is longitudinally magnetized by direct current passed through a wire coil 26 surrounding the tapered section, the source of current being indicated by the battery 27. The round waveguide 17 is provided with a side arm 28 which may be a rectangular waveguide arm of either series or shunt form. This arm is so oriented with relation to the orientation of the $TE_{11}$ microwave field applied from waveguide 16 as to be unaffected thereby. The side arm 28 is connected to a demodulator 29 from which the demodulated output is taken through the electric conductor 31.

The demodulator 29 may be of any form suitable for deriving from an amplitude-modulated microwave signal a low frequency signal having all of the frequency and amplitude characteristics of the original modulating signal employed to modulate generator 11. For example, the demodulator 29 may include a first heterodyne frequency converter converting the microwave frequency signal to an intermediate frequency signal, followed by an intermediate frequency amplifier and finally by a second detector or rectifier combined with a low-pass filter giving a low-frequency signal in the video or audio range, this signal constituting the demodulated output.

The side arm 28 of round hollow waveguide 17 has for its functions the sensing of the orientation of the reflected microwave field, and the emission of a signal having an intensity representative of the orientation angle. Therefore any other device which will accomplish this result may be employed in place of side arm 28.

The function of duplexer 12 together with absorber 14 is to prevent reflected microwave energy from passing into the generator 11. Any other device, therefore, which will accomplish this purpose may be used in place of the devices 12 and 14. As an example, the widely-used ferrite isolator in either rectangular or round waveguide may be employed to connect the generator 11 to the round waveguide 16 in place of duplexer 12 and absorber 14. Such an isolator may be arranged to pass signals in one direction with substantially no loss but to absorb signals applied in the opposite direction. Other devices including magic tee hybrid junctions in combination with or integrated with the output side arm 28 may be employed for the same purposes.

In the operation of this invention let it be assumed that generator 11 emits a microwave signal having a carrier frequency of 10,000 megacycles per second, frequency modulated by voice or other intelligence signals between the frequency limits of 4500 and 200 cycles per second, and the intelligence signals being modulated in amplitude over a 20 db range. Let it be assumed that the maximum amplitude modulation causes a frequency excursion of the carrier of five megacycles per second. The 20 db range of voice dynamic variation will then cause the output of generator 11 to vary in frequency between the maximum limits of 9,995 mc. p. s. and 10,005 mc. p. s.

The frequency-modulated signal passes through duplexer 12 and round waveguide 16 and enters round hollow waveguide 17 in the transverse $TE_{11}$ mode, which is the dominant mode in round waveguide. The signal does not enter the side arm 28 because the latter is so oriented as to be unaffected.

The microwave $TE_{11}$ field constituting the signal energy and covering a frequency band of 9,995–10,005 mc. p. s. centered at the farrier frequency enters the tapered round waveguide section. The field proceeds therein until each frequency component reaches that waveguide radius which is so small as to prevent further penetration. This penetration distance is different for each frequency component and is proportional to the frequency thereof.

The tapered waveguide, in order to have a length suitable for the frequency band of the applied signal, should have a median radius at cross section 32 having a cutoff frequency equal to the carrier frequency. The radius at the cross section 19 should be at least as large as the radius corresponding to a cutoff frequency of 9,995 mc. p. s. and the radius at the cross section 21 should be at least as small as the radius corresponding to a cutoff frequency of 10,005 mc. p. s.

Each frequency in the signal field is thus reflected at a specific and different point along the length of the tapered section. When the frequency is 9,995 mc. p. s. the field can penetrate only to the cutoff cross section at or just beyond cross section 19; when the frequency is that of the carrier, penetration is to cross section 32; and when the frequency is 10,005 mc. p. s. the penetration is to or nearly to cross section 21.

In each case the field is rotated as it penetrates the tapered section by an amount depending on the axial distance of penetration, and the field after it is reflected is again rotated by the same amount and in the same direction as it travels back toward the side arm 28. As a specific example, let it be supposed that an instant is selected when the frequency-modulated signal has the carrier frequency of 10,000 mc. p. s. The field penetrates the tapered section as far as the median cross section 32 and in doing so traverses the distance $d$ from left to right in the drawing. In this travel the transverse field is rotated by the effect of the magnetized ferrite rod 24. Assume this rotation is 14° and is clockwise to an observer at the small end of the tapered section. After reflection the field again traverses the distance $d$ from right to left and is again rotated 14° clockwise as observed from the small end of the tapered section. The total rotation of the field moving toward arm 28 is thus 28°.

All frequencies less than 10,000 mc. p. s. will result in the field being reflected at points to the left of the median cross section 32 and being rotated proportionately less than 28°, and all frequencies over 10,000 mc. p. s., being reflected from points smaller than cross section 32 and to the right thereof will be rotated proportionally more than 28°.

All of the reflected field energy will therefore arrive at side arm 28 having a band of field rotation representative of the microwave bandwidth and of the microwave frequency excursion which in turn is representative of the dynamic range of the original generator modulation. Since the side arm 28 is sensitive to field orientation and admits the reflected field in amplitudes representative of the amount of departure or rotation of the orientation or polarization thereof from the datum value, which is that of the applied generator field, the amplitude of the signal passing through the side arm 28 is representative of the amount by which the reflected field has been rotated. This in turn is representative of the dynamic range of the original modulating signal. The maximum rotation which the ferrite rod 24 can produce at any frequency is limited by design to 90° in order that the output amplitudes may uniquely represent the dynamic range.

The microwave signal in the output side arm 28 is both amplitude modulated and frequency modulated. Therefore at this point in the circuit the principal object of the invention has been accomplished, namely, the derivation of an amplitude-modulated microwave signal having amplitudes representative of the amplitudes in the original modulation.

The signal is now applied to demodulator 29 which may be of any form as before stated, but necessarily involves a detector and filter which derives the original low-frequency video or audio modulation and filters out higher frequencies including the microwave frequency and intermediate frequencies if intermediate frequency amplification has been employed.

What is claimed is:

1. A microwave frequency modulation transducer comprising, a round tapered microwave waveguide having a radius becoming progressively smaller from one end to the other, whereby said tapered waveguide possesses a range of cutoff frequencies, said tapered waveguide containing microwave field rotating means producing a rotation of microwave energy which is proportional to the length of travel therealong by said microwave energy, means applying to said one end of the tapered waveguide a frequency-modulated microwave field in a transversely polarized mode having a frequency band within said range of cutoff frequencies of said tapered waveguide, and means adjacent to said one end of the tapered waveguide for receiving and conducting field energy reflected from said tapered waveguide at an amplitude representative of the angular rotation thereof.

2. A microwave frequency modulation transducer comprising, a round hollow tapered microwave waveguide having a diameter becoming progressively smaller from one end to the other, whereby said tapered waveguide possesses a range of cutoff frequencies, said tapered waveguide containing microwave field rotating means including an axial ferrite member having rotational effect proportional to axial length of penetration of microwave energy, a microwave transmission circuit connected to said one end of the tapered waveguide applying thereto a frequency-modulated microwave field in the $TE_{11}$ mode having a frequency band within said range of cutoff frequencies of said tapered waveguide, said microwave field being selectively reflected and correspondingly rotated at said tapered waveguide, and a rectangular waveguide side arm coupled to said transmission circuit and so oriented with respect thereto as to accept amplitudes of field energy reflected from said tapered waveguide in proportion to the degree of rotation of the orientation of said field energy.

3. A microwave frequency modulation transducer comprising, a round hollow tapered waveguide section having a diameter becoming progressively smaller from one end to the other, whereby said tapered waveguide section possesses a range of cutoff frequencies, a ferrite rod positioned internally of said tapered waveguide section, means for applying a magnetic field thereto, transmission waveguide means applying frequency modulated microwave energy in the $TE_{11}$ mode to the larger end of said tapered waveguide section, said microwave energy having a frequency band within the range of cutoff frequencies of said tapered waveguide section, and a rectangular waveguide side arm coupled to said transmission waveguide means and so oriented with respect thereto as to accept amplitudes of field energy reflected from said tapered waveguide section in proportion to the degree of rotation of the field energy introduced therein and reflected thereby.

4. A microwave frequency modulation transducer comprising, a round hollow tapered microwave waveguide having a diameter becoming progressively smaller from one end to the other, whereby said tapered waveguide possesses a range of cutoff frequencies, said tapered waveguide containing microwave field rotating means including an axial ferrite member having rotational effect proportional to axial length, round waveguide means connected to said one end of the tapered waveguide, a generator of frequency-modulated microwave energy having a frequency band within said range of cutoff frequencies of said tapered waveguide, a transmission line connecting said generator to said round waveguide means whereby a microwave $TE_{11}$ field is induced therein having a frequency band within said range of cutoff frequencies of the tapered waveguide, said microwave field being thus introduced to said tapered waveguide and selectively reflected and correspondingly rotated therein, means in said transmission line permitting transmission of microwave energy from said generator but not to said generator, and a rectangular waveguide side arm coupled to said round waveguide means so oriented with respect thereto as not to accept energy from said generator but to accept amplitudes of field energy reflected from said tapered waveguide in proportion to the degree of rotation of said field energy by said field rotating means.

5. A microwave discriminator comprising, a round hollow tapered microwave waveguide having a diameter becoming progressively smaller from one end to the other whereby said tapered waveguide possesses a range of cutoff frequencies, said tapered waveguide containing microwave field rotating means including an axial ferrite member having rotational effect proportional to axial length, transmission waveguide connected to said one end of the tapered waveguide, a generator of frequency-modulated microwave energy having a frequency band within said range of cutoff frequencies of said tapered waveguide, a transmission line connecting said generator to said transmission waveguide whereby a microwave $TE_{11}$ field is induced therein having a frequency band within said range of cutoff frequencies of the tapered waveguide, said microwave field being thus introduced to said tapered waveguide and selectively reflected and correspondingly rotated therein, means in said transmission line permitting transmission of microwave energy from said generator to said round waveguide means but preventing transmission in the reverse direction to the generator, a rectangular waveguide side arm coupled to said transmission waveguide, the orientation thereof preventing entrance of energy from said generator but permitting reflected and rotated energy to enter in amplitude proportional to the rotation, and detector means connected to said side arm demodulating the amplitude-modulated component therein to recover a signal representative of the original generator modulating signal.

References Cited in the file of this patent

UNITED STATES PATENTS

| | | |
|---|---|---|
| 2,051,537 | Wolff | Aug. 18, 1936 |
| 2,299,619 | Fritz | Oct. 20, 1942 |
| 2,767,379 | Mumford | Oct. 16, 1956 |
| 2,810,890 | Klopfenstein | Oct. 22, 1957 |